United States Patent
Samanta et al.

(10) Patent No.: US 8,298,661 B2
(45) Date of Patent: *Oct. 30, 2012

(54) WATERPROOFING MEMBRANE

(75) Inventors: Susnata Samanta, Medford, MA (US); Robert A. Wiercinski, Lincoln, MA (US)

(73) Assignee: W. R. Grace & Co.-Conn, Columbia, MD (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/549,780

(22) Filed: Aug. 28, 2009

(65) Prior Publication Data

US 2010/0196648 A1 Aug. 5, 2010

Related U.S. Application Data

(60) Provisional application No. 61/148,547, filed on Jan. 30, 2009.

(51) Int. Cl.
B32B 15/04 (2006.01)
B32B 9/00 (2006.01)

(52) U.S. Cl. ............ 428/343; 428/40.1; 428/355

(58) Field of Classification Search .......... 428/343
See application file for complete search history.

(56) References Cited

U.S. PATENT DOCUMENTS

| | | | |
|---|---|---|---|
| 3,329,636 A * | 7/1967 | Henschel | 524/68 |
| 3,644,240 A | 2/1972 | Tarbell et al. | |
| 3,853,682 A * | 12/1974 | Hurst | 428/40.3 |
| 4,485,201 A | 11/1984 | Davis | |
| 4,868,233 A | 9/1989 | Moran | |
| 4,876,130 A * | 10/1989 | Vonk et al. | 428/40.3 |
| 4,973,615 A | 11/1990 | Futamura et al. | |
| 5,380,773 A | 1/1995 | Bellio et al. | |
| 5,558,703 A | 9/1996 | Bredael | |
| 5,959,007 A * | 9/1999 | Liang | 524/62 |
| 6,100,317 A | 8/2000 | Liang et al. | |
| 6,538,060 B2 | 3/2003 | Rajalingam et al. | |
| 6,583,202 B1 | 6/2003 | Grube et al. | |
| 7,317,045 B2 | 1/2008 | Zanchetta et al. | |
| 2005/0202197 A1 | 9/2005 | Mohseen et al. | |
| 2007/0249761 A1 | 10/2007 | Guymon et al. | |

FOREIGN PATENT DOCUMENTS

| | | |
|---|---|---|
| CN | 101205393 A1 | 6/2008 |
| CN | 101205396 A1 | 6/2008 |
| EP | 0667374 A2 | 8/1995 |
| GB | 1490183 A | 10/1977 |

(Continued)

OTHER PUBLICATIONS

Eastman Chemical Company, Eastoflex Amorphous Polyolefin, general information sheet, Aug. 2000, 8 pages, Publication WA-4F.

(Continued)

Primary Examiner — Callie Shosho
Assistant Examiner — Samir Shah
(74) Attorney, Agent, or Firm — Stephan P. Williams; Craig K. Leon

(57) ABSTRACT

Disclosed is a waterproofing membrane that performs well at both high and low temperatures. The waterproofing membrane comprises a carrier support layer and an adhesive layer, wherein the adhesive layer comprises a pressure sensitive bitumen composition comprising bitumen (asphalt), synthetic rubber, high density polyethylene, ground vulcanized crumb rubber and, optionally, a plasticizer. The waterproofing membrane also may optionally include a removable release sheet on the adhesive layer.

13 Claims, 1 Drawing Sheet

FOREIGN PATENT DOCUMENTS

| | | |
|---|---|---|
| WO | 0077098 A1 | 12/2000 |
| WO | 2006/107179 A2 | 10/2006 |
| WO | 2008/049312 A1 | 5/2008 |

OTHER PUBLICATIONS

Eastman Chemical Company, Pressure-Sensitive Adhesives Based on Amorphous Polyolefin From Eastman Chemical Company, general information sheet, Feb. 1999, 19 pages, Publication WA-23A.

Meier, Stefan, Form PCT/ISA/210, International Search Report, PCT/US2010/020581, dated May 4, 2010, 3 pages.

Meier, Stefan, Form PCT/ISA/237, Written Opinion of the International Searching Authority, PCT/US2010/020581, dated May 4, 2010, 6 pages.

Pamies Olle, Silvia, Form PCT/ISA/210, International Search Report, PCT/US2010/020583, dated Apr. 22, 2010, 3 pages.

Pamies Olle, Silvia, Form PCT/ISA/237, Written Opinion of the International Searching Authority, PCT/US2010/020583, dated Apr. 22, 2010, 5 pages.

* cited by examiner

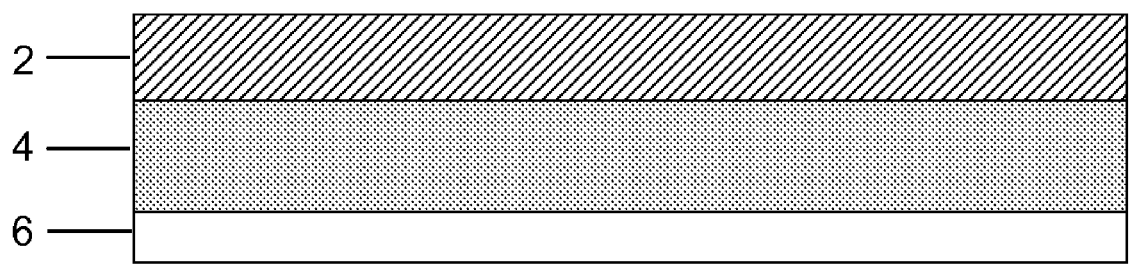

WATERPROOFING MEMBRANE

This application claims the benefit of U.S. Provisional Application 61/148,547, filed Jan. 30, 2009.

FIELD OF THE INVENTION

The present invention relates to an adhesive waterproofing membrane that is adhered to a building or construction substrate to prevent water infiltration. In particular, it relates to a waterproofing membrane that performs well at both high and low temperatures.

BACKGROUND OF THE INVENTION

Sheet-like waterproofing membranes are well-known for application to concrete and other building and construction substrates, such as roofs and foundations. These waterproofing membranes typically are laminates that comprise a carrier sheet and a pressure sensitive adhesive layer. The pressure sensitive adhesive layer is typically made of rubber modified asphalt (bitumen). The membranes also typically include a removable release sheet that is used to prevent the adhesive portion of the membrane from adhering to the carrier sheet or other portion of the membrane when the membrane is rolled up. This release sheet must be removed from the membrane prior to or during installation.

Although there are numerous varieties of waterproofing membranes disclosed in the art, it has been difficult to produce a waterproofing membrane that exhibits good performance characteristics at both high and low temperatures. Ideal performance characteristics for the pressure sensitive adhesive include resistance to flow at temperatures up to 240° F. (116° C.) without the need for internal reinforcement of the adhesive; good adhesion over a broad temperature range; resistance to cracking at temperatures as low as −20° F. (−29° C.); and low viscosity at mixing and coating temperatures (typically about 300-375° F. or about 149-191° C.) for easy manufacturing.

Bitumen itself does not exhibit pressure sensitive adhesive characteristics, is brittle at low temperatures and exhibits excessive flow at high temperatures. Typically, elastomers, such as SBS, SBR, SIS, and SEBS, are blended with bitumen to produce pressure sensitive adhesive characteristics, and to provide flexibility at low temperatures and resistance to flow at high temperatures. In addition, a plasticizer such as a petroleum oil may also be required. However, use of elastomers alone does not produce the desired performance at both high and low temperatures. Often, one performance characteristic is sacrificed to obtain another.

Thermoplastics such as high density polyethylene, low density polyethylene, ethylene vinyl acetate (EVA), atactic polypropylene (APP), and polypropylene have been used for bitumen modification. However, thermoplastics are generally less compatible with bitumen than the elastomers previously described and blends of thermoplastics and bitumen generally do not exhibit pressure sensitive characteristics. Depending on the thermoplastic(s) used, high temperature flow resistance and/or low temperature flexibility may be improved or negatively affected. U.S. Pat. No. 7,317,045 describes a modified bitumen composition comprising a blend of asphalt and polyethylene, where the polyethylene is a mixture of high density polyethylene (HDPE) and low density polyethylene (LDPE).

Recycled vulcanized elastomers such as ground tire scrap also have been added to bitumen compositions. These additives generally behave like inert fillers and only minimally impact high temperature flow resistance and low temperature flexibility. See, for example, U.S. Pat. Nos. 3,644,420, 5,558,703, CN 101205393 and CN 101205396.

It is an object of the present invention to provide a waterproofing membrane with improved high and low temperature performance characteristics.

SUMMARY OF THE INVENTION

The present invention embraces a waterproofing membrane that performs well at both high and low temperatures. The waterproofing membrane is in the form of a sheet-like laminate and comprises a carrier support layer and an adhesive layer, wherein the adhesive layer comprises a pressure sensitive bitumen composition comprising bitumen (asphalt), synthetic rubber, high density polyethylene, ground vulcanized crumb rubber and, optionally, a plasticizer. The waterproofing membrane also may optionally include a removable release sheet on the adhesive layer to prevent the membrane from adhering to itself when rolled up (i.e., to prevent the adhesive layer from adhering to the side of the carrier support layer opposite the adhesive layer). The adhesive used in the waterproofing membrane of the present invention has excellent adhesion (at both high and low temperatures), excellent sag resistance (at high temperature) without the need for internal reinforcement, and excellent flexibility without cracking (at low temperature). In addition, the adhesive has low viscosity at mixing and coating temperatures and is more environmentally friendly ("green") because of its content of recycled material.

BRIEF DESCRIPTION OF THE DRAWINGS

FIG. 1 depicts a cross-section of a waterproofing membrane of the present invention.

DETAILED DESCRIPTION OF THE INVENTION

One embodiment of the waterproofing membrane of the present invention is depicted in FIG. 1, which shows a cross-section of the membrane taken along the width of the membrane. Typical commercial membranes are in the form of a sheet-like laminate with a width in the range of about 30 to 185 cm, more typically about 60 to 140 cm, preferably about 80 to 130 cm, and a length of about 5 to 60 m, more typically about 15 to 36 m, and are rolled up into a roll. These membranes generally have a thickness of about 0.15 mm to about 5 mm, more typically about 0.25 mm to about 2.5 mm, preferably about 0.5 mm to about 1.8 mm.

As shown in FIG. 1, the waterproofing membrane comprises at least two laminated layers, and preferably at least three laminated layers. The first layer is a carrier support layer 2 and the second layer is an adhesive layer 4. Optionally, and preferably, the waterproofing membrane laminate includes a third layer, which is a removable release sheet 6 on the adhesive layer 4. As depicted, the release sheet 6 is on the side of the adhesive layer 4 that is opposite the side of the adhesive layer that is adhered to the carrier support layer 2. The waterproofing membrane may optionally include additional layers of material on either face of the carrier support layer as desired. The adhesive layer is adhered either directly onto a surface of the carrier support layer, or indirectly if there is an optional additional layer of material interposed between the carrier support layer and the adhesive layer.

The adhesive layer comprises a pressure sensitive bitumen composition comprising bitumen (asphalt), synthetic rubber, high density polyethylene, ground vulcanized crumb rubber and, optionally, a plasticizer. Generally, the pressure sensitive bitumen composition will comprise (by weight) about 45-86%, preferably about 55-68%, more preferably about 59-68%, asphalt (bitumen); about 5-20%, preferably about 8-15%, more preferably about 10-14% synthetic rubber; about 1-10%, preferably about 3-10%, more preferably about 4-6%, high density polyethylene (HDPE); about 1-10%, preferably about 3-10%, more preferably about 4-6%, ground vulcanized crumb rubber; and about 0-25%, preferably about 10-20%, more preferably about 12-18% oil plasticizer. The adhesive layer typically will have a thickness of about 0.02 to 2.5 mm, preferably about 0.1 to 2.0 mm, more preferably about 0.5 to 1.5 mm.

Optionally, the bitumen composition may include inorganic filler. If included, the amount of inorganic filler is independent of the levels of the organic ingredients (asphalt, rubber, HDPE, tire scrap, plasticizer), which proportions should remain within the parameters set forth above. Thus, a suitable amount of inorganic filler can comprise about 0-35% of the total composition of organic ingredients plus filler.

The asphalt (bitumen) may be any type of asphalt that is commonly used for waterproofing membrane applications. Generally, suitable asphalts will have a penetration value (ASTM D-5) in the range of about 20-350 dmm, preferably about 40-200 dmm, most preferably 50-100 dmm.

The synthetic rubber may be any of those synthetic rubbers typically used in modified bitumen pressure sensitive adhesives. Particularly suitable rubbers include styrene-isoprene-styrene (SIS), styrene-ethylene-butylene-styrene (SEBS), styrene-butadiene (SB) block copolymer, and styrene-butadiene rubber (SBR), as well as mixtures or blends of two or more of these rubbers. Other synthetic rubbers include polyisoprene, polyisobutylene, and chloroprene. A preferred rubber is styrene-butadiene (SB) block copolymer, which includes styrene-butadiene-styrene (SBS), a linear block copolymer, styrene-butadiene $(SB)_x$ radial block copolymer, and styrene-butadiene (SB) linear diblock copolymer. Any combination of SBS linear, (SB)x radial block copolymer, and SB linear diblock copolymer may be used and are all herein referred to generally as SB rubber or SB copolymer. A preferred combination is a mixture of an $(SB)_x$ radial block copolymer and an SB diblock copolymer. A suitable ratio of $(SB)_x$ radial block copolymer to SB diblock copolymer is about 0.5 to 2.0. The weight % styrene is 10% to 35%. SIS block copolymers may be used as well, either alone or in combination with SBS, $(SB)_x$ radial block copolymer, and SB linear diblock copolymer. A preferred SBS synthetic rubber is a blend of Dynasol 411 $(SB)_x$ radial block copolymer (styrene:butadiene 30%:70%) and Dynasol 1205 SB diblock copolymer (styrene:butadiene 25%:75%).

Another preferred rubber is styrene-isoprene (SI) block copolymer, which includes styrene-isoprene-styrene (SIS), a linear block copolymer, styrene-isoprene $(SI)_x$ radial block copolymer, and styrene-isoprene (SI) linear diblock copolymer. Any combination of SIS linear, (SI)x radial block copolymer, and SI linear diblock copolymer may be used and are all herein referred to generally as SIS rubber or SIS copolymer. A preferred combination is a mixture of an (SI) linear diblock copolymer and an SIS linear triblock copolymer. In styrene-isoprene (SI) block copolymer, suitable SI diblock content ranges from 15-56%, weight % styrene is 15% to 44%, and solution viscosity is 0.3 to 1.6 PaS (@25% in toluene @25° C.). A preferred SIS synthetic rubber is Kraton 1163P or Kraton 1193P linear SIS triblock copolymer with preferred styrene content of 15-24% and SI diblock content of 19-39% and solution viscosity in the range of 0.4-0.9 PaS (@25% in toluene E25° C.).

One preferred combination of synthetic rubbers is a mixture of (SB) and (SI) block copolymers comprising from 0-10%, preferably 2-9%, linear (SB) diblock copolymer, 0-12%, preferably 2-10%, of (SB)x radial block copolymer and 0-14%, preferably 1-12%, (SI) linear triblock copolymer, such that the total synthetic rubber in the composition comprises about 8-15%.

High density polyethylene (HDPE) typically has a density greater than $0.94$ g/cm$^3$, preferably $0.95$ g/cm$^3$ or greater, generally up to about $0.97$ g/cm$^3$. In order to provide the modified bitumen with good high temperature flow resistance (up to about 115° C. (240° F.), it is believed that the melting point of the HDPE should be greater than 115° C. Preferred HDPE's will have a melting point of about 125-140° C. (as measured by DSC), more preferably about 130-140° C. The elongation at break may be in the range of 25% to 1000% according to ASTM D638. It is believed that high elongation is needed to insure that the adhesive composition has high elongation. The melt index according to ASTM D1238 (190° C./2.16 kg) is typically 0.1 g/10 min to 30 g/10 min, preferably 3 g/10 min to 15 g/10 min. The number average molecular weight may be 12,000 to 1,000,000.

The ground vulcanized crumb rubber is just that—vulcanized, ground rubber. Preferably it is ground recycled rubber, such as ground recycled tires. The average particle size (weight average) of the ground rubber ranges from about 50 µm to about 2000 µm, preferably about 50 µm to about 800 µm.

The pressure sensitive bitumen composition may also optionally include an oil plasticizer, and preferably includes an oil plasticizer. The oil plasticizer is a petroleum-based oil and may be an aromatic, naphthenic or paraffinic oil. The aniline point (ASTM D611) is generally in the range of about 15° C. (60° F.) to about 104° C. (220° F.), preferably about 15° C. (60° F.) to about 74° C. (165° F.). The viscosity of the oil (ASTM D445) at 100° C. is about 3-50 cSt.

The pressure sensitive bitumen composition may also include an inorganic filler as previously mentioned. The inorganic filler may be any of those fillers typically used in modified bitumen pressure sensitive adhesives. Such fillers typically include silica, calcium carbonate, talc, clay or Portland cement.

The carrier support layer may comprise a film, a nonwoven fabric, or a woven fabric. A film may comprise a polyethylene, polypropylene, polyolefin, polyethylene-polypropylene copolymer, polyethylene terephthalate (PET), polyvinylchloride (PVC), thermoplastic polyolefin (TPO), or polyamide (nylon). A mono-layer film or a multi-layer film (coextruded or laminated) may be used. A film comprising polypropylene is preferred. The film thickness is typically about 0.01-0.51 mm (about 0.5-20 mils), preferably about 0.05-0.25 mm (about 2-10 mils).

Another preferred film is a cross-laminated HPDE film made by VanLeer, sold under the trade name Valeron. Cross-laminated polypropylene films are preferred. An additional preferred film is a coextruded film of polypropylene, nylon and ethylene vinyl acetate made by Hutamaki.

A fabric, which may be woven or non-woven, may comprise a polyethylene, polypropylene, polyolefin, polyethylene terephthalate, glass, or polyamide. The weight of the fabric is 0.5 oz/yd to 10 oz/yd (16.7 g/m$^2$ to 334.8 g/m$^2$). A woven polypropylene fabric is preferred. The woven polypropylene fabric comprises a first plurality of polyolefin tapes extending in the lengthwise or major direction (MD) interwoven with a second plurality of polypropylene tapes extending in the widthwise or cross direction (CD). The plurality of tapes in the MD and CD may independently range from 3 to 30 tapes/inch (1.2 to 11.8 tapes/cm), preferably 5 to 15 tapes/inch (2 to 5.9 tapes/cm). The tapes used to produce the mesh are generally produced by first extruding a polyolefin film, orienting the polyolefin film in the machine direction, slitting the film into narrow widths (or tapes), and annealing the tapes. The tapes are then woven into a mesh. If desired, annealing may be done after weaving.

An extrusion coated fabric may also be used. The fabric be woven or non-woven and may be coated on one side or both sides. The woven polypropylene fabric described above is preferred. The fabric weight is 1 oz/yd to 4 oz/yd (33.4 g/m$^2$ to 133.9 g/m$^2$). The extrusion coating may comprise polyethylene, polypropylene, a copolymer of ethylene and methyl acrylate, a copolymer of ethylene and butyl acrylate, a copolymer of ethylene and propylene, a blend of ethylene or propylene, or ethylene vinyl acetate (EVA). The extrusion coated layer(s) may comprise a single layer or multiple layers. The thickness of the extrusion coated layers is about 0.013-0.076 mm (about 0.5-3 mils). A preferred carrier support layer comprises a woven polypropylene fabric coated on one side or both sides with polypropylene film.

Another preferred carrier comprises a woven polypropylene fabric coated on one side with polypropylene and on the other side with ethylene vinyl acetate (EVA), a coextruded layer of polypropylene/copolymer of ethylene and methyl acrylate (with the copolymer of ethylene and methyl acrylate facing outwards), a coextruded layer of polypropylene/copolymer of ethylene and propylene (with the copolymer of ethylene and propylene facing outwards) or a coextruded layer of polypropylene/copolymer of ethylene and butyl acrylate (with the copolymer of ethylene and butyl acrylate facing outwards). Generally, for such coated fabrics, the polypropylene coated side is in contact with the adhesive. Another suitable carrier comprises a woven polypropylene fabric extrusion laminated to a film on one or both faces.

The carrier support layer may be coated on the top or outer surface (i.e., the surface opposite that adhered to the adhesive layer) with a non-skid coating layer. The non-skid coating layer may comprise, atactic polypropylene, ethylene-vinyl acetate, low molecular weight polyethylene or polypropylene (e.g., available under the brand Epolene by Eastman), polyolefin plastomers (e.g., available under the brand Affinity by Dow), and amorphous polyolefins (e.g., available under the brand Eastoflex by Eastman). These are typically low molecular weight polypropylene homopolymers, low molecular weight polypropylene-ethylene copolymers, and blends of these two materials. If present, the non-skid coating layer typically will have a thickness of about 0.01-0.13 mm (about 0.5-5 mils), and will preferably be embossed for better skid resistance.

Optionally, and preferably, the waterproofing membrane will include a removable release sheet 6 on the adhesive layer 4. The release sheet comprises a film or paper that is coated with a release agent, preferably a silicone. The film may comprise polyethylene, polypropylene, polyethylene terephthalate, or polyamide. A paper release sheet may also be coated with a polyolefin layer prior to being coated on the polyolefin face with a silicone release agent. The thickness of the release sheet is typically about 0.01-0.13 mm (about 0.5-5 mils).

The waterproofing membrane may be fabricated as follows. Asphalt and oil are charged into a high shear rotor/stator mixer and heated to about 135-190° C. (275-375° F.). The synthetic rubber (SBS), HDPE, and crumb rubber are added and mixed until the SBS and HDPE are dissolved or dispersed. The crumb rubber will not dissolve, but particle size may be reduced with high shear in-line mixing. (Alternatively, synthetic rubber (SBS) and HDPE are first dissolved or dispersed prior to adding the crumb rubber.) While maintaining the mixing temperature, the resulting hot melt pressure sensitive adhesive is coated onto a release liner. Suitable coaters include knife over roll, slot die coater, or roll coater. The adhesive coated release liner is cooled by contact with a chilled plate and or chilled roll(s). A carrier support layer is laminated to the adhesive and the three layer structure is wound into a roll.

The waterproofing membranes of the present invention may be used for waterproofing below grade and deck concrete structures, concrete and metal pipes, wall structures comprising gypsum, cast concrete, concrete block, wood, plywood, or oriented strand board, and roof structures comprising gypsum, cast concrete, wood, plywood, or oriented strand board. The preferred application is as a roofing underlayment, particularly for applications at high temperature. The waterproofing membranes are applied by removing the release liner and applying the exposed adhesive face of the membrane to the substrate.

EXAMPLES

Waterproofing membranes having the formulations set out in the Table below were prepared as described previously. The SBS rubber is a blend of 411 (SB)$_x$ and 1205 SB (as described earlier). The tire scrap passes through 30 mesh (595 µm). Formulations 1 to 4 are all preferred embodiments of the present invention and meet the combination of desired performance characteristics. Formulation 5, without HDPE, had unacceptable sag at 115° C. (240° F.). Formulations 6 to 8, without ground tire scrap, did not meet one or more of the desired combination of performance characteristics. Formulation 9, with LDPE substituted for HDPE, had unacceptable sag at 115° C. (240° F.). Minimal acceptable adhesion (ASTM D1970 at 75° F. (24° C.)) is at least 1.0 pli (pounds per lineal inch).

TABLE

| Ex | Asphalt | Oil | (SB)x | SB | Tire Scrap | HDPE | LDPE | Sag 115° C. | LTF | Adhesion pli 24° C. | Viscosity cps 163° C. |
|---|---|---|---|---|---|---|---|---|---|---|---|
| 1 | 64 | 16 | 6 | 4 | 5 | 5 |  | pass | pass | 1.77 | 9,000 |
| 2 | 62 | 15 | 4 | 6 | 10 | 3 |  | pass | pass | 1.9 | 37,000 |
| 3 | 62 | 18 | 8 | 4 | 4 | 4 |  | pass | pass | 2.9 | 8,000 |
| 4 | 59 | 18 | 8 | 5 | 4 | 6 |  | pass | pass |  |  |
| 5 | 64 | 16 | 6 | 4 | 10 |  |  | fail | pass | 2.2 |  |
| 6 | 67 | 17 | 7 | 4 |  | 5 |  | fail | pass | 0.35 |  |
| 7 | 66 | 16 | 4 | 7 |  | 7 |  | pass | fail |  |  |
| 8 | 64 | 16 | 6 | 4 |  | 10 |  | pass | fail | 0.2 |  |
| 9 | 60 | 15 | 4 | 6 | 10 |  | 5 | fail | pass |  |  |

Sag is a measurement of the amount of vertical movement of a test sample of adhesive at 115° C. The test sample is 3 in long (7.62 cm), 0.5 in wide (1.27 cm) and 36 mils thick (0.036 in; 0.91 mm), with one end of the sample cut or formed into a V-shaped point. Three test samples are adhered to a plywood substrate with the sample point downward. The substrate is marked with a measuring line at the end of the sample point. The substrate with samples is placed vertically in an oven at 115° C. (240° F.) for 24 hours. The samples pass the sag test if the pointed ends of the samples move less than 0.125 in (3.2 mm) beyond the measuring line (i.e., their original starting point).

LTF is low temperature flexibility and was performed in accordance with ASTM D1970 at −20° F. (−29° C.). Adhesion is measured at 75° F. (24° C.) in accordance with ASTM D1970. The measured force is in pounds per linear inch (pli) as measured by an Instron materials testing machine. Viscosity is measured with a parallel plate Rheometer at 325° F. (163° C.), a shear rate of 8 sec$^{-1}$, a plate diameter of 25 mm, and 1 mm gap.

The invention claimed is:

1. A waterproofing membrane in the form of a sheet-like laminate comprising a carrier support layer and an adhesive layer, wherein the adhesive layer comprises a pressure sensitive bitumen composition comprising bitumen, synthetic rubber, high density polyethylene, ground vulcanized crumb rubber and, optionally, a plasticizer.

2. The waterproofing membrane of claim 1 wherein the bitumen composition comprises, by weight, about 45-86% asphalt; about 5-20% synthetic rubber; about 1-10% high density polyethylene; about 1-10% ground vulcanized crumb rubber; and about 0-25% oil plasticizer.

3. The waterproofing membrane of claim 1 wherein the bitumen composition comprises, by weight, about 55-68% asphalt; about 8-15% synthetic rubber; about 3-10% high density polyethylene; about 3-10% ground vulcanized crumb rubber; and about 10-20% oil plasticizer.

4. The waterproofing membrane of claim 1 wherein the bitumen composition comprises, by weight, about 59-68% asphalt; about 10-14% synthetic rubber; about 4-6% high density polyethylene; about 4-6% ground vulcanized crumb rubber; and about 12-18% oil plasticizer.

5. The waterproofing membrane of claim 2, 3 or 4 wherein the synthetic rubber comprises styrene-isoprene-styrene (SIS), styrene-ethylene-butylene-styrene (SEBS), styrene-butadiene-styrene (SBS), styrene-butadiene (SB), styrene-isoprene (SI) or mixtures or blends of two or more of these rubbers.

6. The waterproofing membrane of claim 2, 3 or 4 wherein the synthetic rubber comprises styrene-isoprene-styrene (SIS), styrene-butadiene (SB) block copolymer or a mixture or blend of these rubbers.

7. The waterproofing membrane of claim 2, 3 or 4 wherein the synthetic rubber comprises styrene-butadiene (SB) block copolymer.

8. The waterproofing membrane of claim 7 wherein the styrene-butadiene (SB) block copolymer comprises one or more of a linear SBS block copolymer, an $(SB)_x$ radial block copolymer and an SB linear diblock copolymer.

9. The waterproofing membrane according to claim 1 wherein the carrier support layer comprises a film or fabric.

10. The waterproofing membrane of claim 9 wherein the carrier support layer comprises a film comprising polyethylene, polypropylene, polyolefin, polyethylene-polypropylene copolymer, polyethylene terephthalate, polyvinylchloride, thermoplastic polyolefin, or polyamide.

11. The waterproofing membrane of claim 9 wherein the carrier support layer comprises a woven or non-woven fabric comprising polyethylene, polypropylene, polyolefin, polyethylene terephthalate, glass, or polyamide.

12. The waterproofing membrane of claim 9 wherein the carrier support layer comprises a woven polypropylene fabric.

13. The waterproofing membrane according to claim 1 additionally comprising a removable release sheet on the adhesive layer, wherein the release sheet is located on the outwardly facing side of the adhesive layer opposite the side of the adhesive layer that faces the carrier support layer.

* * * * *